United States Patent [19]

Chenard et al.

[11] Patent Number: 5,506,296
[45] Date of Patent: Apr. 9, 1996

[54] MOISTURE-CURABLE HOT-MELT ADHESIVE COMPOSITIONS

[75] Inventors: Jean-Yves Chenard, Pau; Jean-Pierre Dupic, Orthez; Jean-Claude Jammet, Grisolles, all of France

[73] Assignee: Elf Atochem S.A., Puteaux, France

[21] Appl. No.: 504,694

[22] Filed: Jul. 20, 1995

Related U.S. Application Data

[63] Continuation of Ser. No. 161,469, Dec. 6, 1993, abandoned.

[30] Foreign Application Priority Data

Dec. 4, 1992 [FR] France .................................. 92 14634

[51] Int. Cl.$^6$ .......................... C08F 216/06; C08A 63/91; C08L 19/22; C08G 18/04
[52] U.S. Cl. ................... 525/56; 525/58; 525/61; 525/328.8; 525/374
[58] Field of Search ................... 524/270, 271, 524/272, 274; 525/56, 58, 61, 328.8, 374

[56] References Cited

U.S. PATENT DOCUMENTS

| 4,091,195 | 5/1978 | Vitek | 525/374 |
|---|---|---|---|
| 4,442,145 | 4/1984 | Probst et al. | 525/374 |
| 4,585,819 | 4/1986 | Reischle et al. | 524/196 |
| 4,820,368 | 4/1989 | Markevka et al. | 525/93 |
| 4,855,382 | 8/1989 | Vanhaeren | 528/45 |
| 4,908,408 | 3/1990 | Boutillier et al. | 525/124 |
| 5,064,902 | 11/1991 | Boutillier et al. | 525/124 |
| 5,189,096 | 2/1993 | Boutillier et al. | 525/56 |

*Primary Examiner*—Peter A. Szekely
*Attorney, Agent, or Firm*—Burns, Doane, Swecker & Mathis

[57] ABSTRACT

Unique hot-melt adhesive compositions that irreversibly crosslink in a few days in the presence of atmospheric moisture comprise a polyisocyanated EVA terpolymer having a melt index at 190° C. ranging from 100 to 1,000, such polyisocyanated terpolymer comprising (1) from 60% to 90% by weight of ethylene, (2) from 10% to 40% by weight of vinyl acetate and (3) from 5 to 60 meq. OH of an ethylenically unsaturated termonomer bearing at least one primary hydroxyl functional group per mole, and the composition being essentially devoid of free hydroxyl functional groups.

20 Claims, No Drawings

MOISTURE-CURABLE HOT-MELT ADHESIVE COMPOSITIONS

This application is a continuation of application Ser. No. 08/161,469, filed Dec. 6, 1993, now abandoned.

BACKGROUND OF THE INVENTION

1. Field of the Invention

The present invention relates to unique hot-melt adhesive compositions, and, more especially, to unique hot-melt adhesive compositions which, after application, crosslink irreversibly in a few days under the effect or influence of atmospheric moisture/humidity.

2. Description of the Prior Art

It is known to this art that a hot-melt adhesive is a formulation which is solid at ordinary temperature and applied in the molten state (at approximately 180° C.), and which hardens on cooling. Such hot-melt adhesives typically contain two principal constituents: a thermoplastic polymer (responsible for good mechanical properties) and a tackifying resin (serving a function where adhesion, tackiness when hot, fluidity and wettability are concerned). A number of additives such as waxes, stabilizers, fillers, etc., are usually included. The thermoplastic polymers most widely employed are ethylene/vinyl acetate copolymers (hereinafter "EVA"), atactic poly-α-olefin ("APAO"), thermoplastic rubber, and others. The tackifying resins are typically selected from among three broad classes: rosins (and derivatives thereof), terpene resins and petroleum-derived resins (aliphatic, aromatic and others). From an industrial standpoint, these hot-melt adhesives present a great number of advantages, which account for their increasing usage:

(a) easy application in automated facilities, (b) short setting time (a few seconds), permitting high adhesive bonding speeds, (c) very good adhesion to a wide variety of substrates: paper, wood, cardboard, textiles, plastics and others, (d) reasonable cost.

However, because of their thermoplasticity, hot-melt adhesives offer only limited heat resistance under load, limited in most instances to 70°–80° C. (100° C. maximum), which precludes their use for certain applications, such as: motor vehicle, building construction, textile, veneering and high-quality bookbinding.

Considerable efforts have been undertaken to remedy this disadvantage.

For a number of years, a wide variety of compositions have been formulated in efforts to avoid the above drawback. These can be classified into two-component products and single-component products. By "two-component" is intended a formulation which is necessarily presented in the form of two separate products which must be mixed at the time of use, because the mixture itself is reactive and because the properties of the final product change as soon as it is produced. By "single-component" product is intended a single unitary product which is stable in storage, as least for a reasonable period of time. The two-component product approach, especially epoxide-based, is cumbersome and tricky. That of the one-component products is more developed, and it is along this line that most of the improvements have ensued.

Thermoplastic polymers of high melting point have been considered in this respect. Commercial products (based on polyamides or polyesters) have a good heat resistance. However, other disadvantages are presented:

(i) difficulty in processing (too high viscosity), (ii) thermal degradation prior to deposition, because of the very high processing temperatures which are required, (iii) short assembly times (time available for effecting the adhesive bonding, from the instant when the molten adhesive is deposited onto the first support to the instant when the adhesive becomes too viscous because of cooling to properly bond to the second support), (iv) mediocre adhesion to certain substrates ("glazing").

Reactive formulations have also been considered which crosslink after bonding. These can be classified into a number of variants, described below.

Thermal crosslinking is attained, for example, by including a blocked isocyanate in a formulation containing hydroxyl groups. To effect the crosslinking, the adhesive must be heated above its application temperature. During this stage, the adhesive is again converted through the liquid state; it is therefore absolutely required that the components to be bonded are maintained in place. This curing lasts in most cases for a few minutes to a few tens of minutes (cf. European Patents Nos. 0,294,271 or 0,302,620). This comprehends that one of the principal advantages of hot-melt adhesives, i.e., virtually instantaneous bonding permitting high rates, is lost, and the use of these particular products is reserved for special cases.

Formulations which chemically crosslink by atmospheric oxygen include alkylboranes. These are more experimental than industrial in nature.

Crosslinking via UV irradiation has been proposed by Dynamit Nobel using polyesters which are sensitive to UV radiation, which permits processing at about 50° C. and, according to the same principle, by Shell, in respect of its product Kraton 1320 X. This route is applicable only to the crosslinking of products having slight thicknesses, and its application is highly specific (for example, application to coating products).

As regards crosslinking at ordinary temperature, no manipulation of the joint is necessary after bonding. The processing is therefore as simple as that of a conventional hot-melt. The crosslinking often occurs under the effect of atmospheric moisture, by virtue of excess isocyanate functional groups in the formulation. Commercial products of this type (described, for example, in European Patent No. 0,107,097—Fuller) which are employed in laminating, or used in motor vehicles, comprise polyurethane oligomers having isocyanate endgroups. Because of the limited stability of isocyanate functional groups, these formulations are used at a lower temperature (typically 130° C.). Heat resistance and chemical resistance after crosslinking are very good. On the other hand, the rapidity of setting (on the order of one minute) and the initial creep resistance (during the first 24 hours), which are greatly inferior to those of the known hot-melt adhesives, with the requirement for storage in the absence of moisture, circumscribe the weak links in this solution. Alternatives are described, for example, in European Patent No. 0,293,602 (Fuller).

And EP-A-0,380,379 describes a crosslinkable hot-melt adhesive composition based on EVA copolymer containing hydroxyl and polyisocyanate functional groups, in the form of a prepolymer containing free isocyanate functional groups, prepared by reacting the EVA copolymer containing hydroxyl functional groups with excess polyisocyanate. Such hydroxylated EVA copolymer contains from 20 to 150 meq. OH/100 g of polymer, which react with the excess isocyanate functional groups during polymerization, resulting in the curing by reaction of the NCO groups with environmental water.

SUMMARY OF THE INVENTION

Accordingly, a major object of the present invention is the provision of unique hot-melt adhesives that crosslink in a few days under the effect of atmospheric moisture. After crosslinking, the subject adhesives exhibit a heat resistance under load $\geq 140°$ C. (namely, a gain of at least 70° C. relative to the noncrosslinkable formulations), while retaining the advantages of the traditional hot-melt adhesives, in particular a short setting time, good creep resistance under load at 25° C. immediately after bonding, and good flexibility, even after complete crosslinking. The improved compositions of the invention are based on a polymer containing hydroxyl groups; it is these hydroxyl groups that, after complete prereaction with an excess of diisocyanate, permit attaining a slow crosslinking under the effect of atmospheric moisture.

Briefly, the present invention features hot-melt adhesive compositions based on the EVA copolymer and polyisocyanate, said EVA copolymer being a copolymer having a melt index at 190° C. ranging from 100 and 1,000 and comprising, relative to the weight of said copolymer:

(1) 60% to 90% of ethylene, (2) 10% to 40% of vinyl acetate, (3) 5 to 40 meq. OH of an ethylenically unsaturated termonomer bearing at least one primary hydroxyl functional group per mole, with the proviso that the composition contains substantially no free hydroxyl functional groups.

DETAILED DESCRIPTION OF BEST MODE AND PREFERRED EMBODIMENTS OF THE INVENTION

More particularly according to the present invention, the EVA copolymer, to which the termonomer has been added, is hereinafter referred to as either the EVA copolymer or terpolymer, or polymer according to the invention, and the like.

The subject EVA copolymer preferably comprises, relative to the weight thereof:

(1) 65% to 90% of ethylene, (2) 20% to 35% of vinyl acetate, (3) 10 to 20 meq. OH of an ethylenically unsaturated termonomer bearing at least on primary hydroxyl functional group per mole.

Said copolymer advantageously has a melt index at 190° C. ranging from 400 to 800.

The hydroxylated termonomer copolymerized with ethylene and vinyl acetate advantageously has the formula:

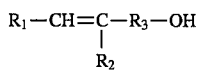

in which $R_1$ is hydrogen or a hydrocarbon radical having from 1 to 8 carbon atoms; $R_2$ is hydrogen or a hydrocarbon radical having from 1 to 4 carbon atoms; and $R_3$ is an ester or $(CH_2)_n$ group, wherein n is a number ranging from 0 to 10, inclusive.

Exemplary such termonomers include allyl alcohol, oleyl alcohol, vinyl alcohol, 2-hydroxyethyl methacrylate ("HEMA") and 2-hydroxyethyl acrylate ("HEA"). HEMA and HEA are particularly preferred.

By the term "meq. OH" is intended "milliequivalents of OH" namely the number of millimoles ($10^{-3}$ mol) of OH hydroxyl functional groups per 100 g of copolymer. Thus, for example, a copolymer containing 10 millimoles of OH functional groups per 100 g has an meq. OH of 10.

The copolymer is reacted with a polyisocyanate, preferably a diisocyanate, which is advantageously aliphatic, cycloaliphatic or aromatic.

The preferred diisocyanates include 2,4-tolylene diisocyanate ("TDI"), diphenylmethane diisocyanate ("MDI"), hexamethylene diisocyanate ("HMDI") and isophorone diisocyanate ("IPDI"). MDI is advantageously employed.

Free isocyanate functional groups remain in the compositions of the invention. The content of free NCO functional groups preferably ranges from 1% to 5% by weight, relative to the total weight of the adhesive. This amount preferably ranges from 2% to 3%. Also, such content permits a good compromise between the rate of crosslinking of the adhesive (after bonding) and its stability when hot (before bonding).

The compositions according to the present invention may additionally contain:

(1) one or more tackifying resins in a resin/polymer ratio which advantageously ranges from 0 to 3. The preferred tackifying resins are aliphatic, aromatic or aliphatic-aromatic (including natural or synthetic terpene resins) and do not contain any functional groups which react with isocyanates;

(2) waxes, plasticizers, fillers and stabilizers which are chemically neutral vis-a-vis isocyanates.

Weakly hydroxylated tackifying resins or waxes can be employed on condition that the hydroxyl functional groups which they contribute are taken into account in calculating the total NCO/total OH ratio, and the amount of simple alcohol which is employed for the reaction with the excess polyisocyanate is proportionately decreased.

The present invention also features a process for the preparation of the subject adhesives, comprising:

(i) melting and drying of the EVA copolymer, optionally of the resin; and (ii) addition and reaction of an alcohol with the polyisocyanate until the required NCO content is obtained.

The hot-melt adhesives according to the invention are advantageously produced in a single step by the following process:

(a) all of the constituents of the formulation, with the exception of the diisocyanate and of the monoalcohol, are melted beforehand at 100°–130° C. and are dried at reduced pressure in a stirred reactor, and then the reactor is purged with dry nitrogen; and (b) the dry monoalcohol and then the diisocyanate are introduced in appropriate proportions and the isocyanate/alcohol reaction is continued at 120° C.–125° C. until the theoretical NCO content is obtained, which requires approximately 4 hours.

At the end of the reaction, the hot-melt adhesive, which is ready for use, is recovered by pouring. In the case of aromatic diisocyanates, the operation is generally carried out in the absence of catalysts. In the event of less reactive diisocyanates (IPDI), a known catalyst for the NCO/OH reaction can be used, such as tin salts (dibutyltin laurate) or amines (diazabicyclooctane).

The copolymers according to the invention are prereacted at 110°–130° C. with a diisocyanate which is conventionally employed, such as 2,4-tolylene diisocyanate (TDI), diphenylmethane diisocyanate (MDI), hexamethylene diisocyanate (HMDI) or isophorone diisocyanate (IPDI). Because of its lower toxicity, MDI is the preferred diisocyanate of the invention. The terpolymer/diisocyanate reaction is conducted in the presence of a large molar excess of diisocyanate to avoid any undesired increase in viscosity.

The excess required depends on the HEA content of the terpolymer (it increases with increasing HEA contents) and of the diisocyanate (a diisocyanate in which the two NCO functional groups have the same reactivity (MDI) requires a larger molar excess than a diisocyanate in which the two NCO functional groups do not have the same reactivity (TDI)). With a HEA content of approximately 2%, the operation is carried out, for example in the case of MDI, with a total NCO/terpolymer OH ratio approximately ranging from 15 to 25. The excess diisocyanate is next neutralized by adding a simple monoalcohol (lauryl alcohol, stearyl alcohol) or a monoalcohol/dialcohol mixture, such as to provide a final total NCO/total OH ratio of from 1.5 to 2.5, and preferably from 1.8 to 2.2.

The viscosity of the adhesives of the invention at their temperature of use (130° C.) typically ranges from 5 to 10 Pa.s. After storage at 130° C. for 4 hours, in contact with the atmosphere, the increase in viscosity of the adhesives of the invention is on the order of 10%, which permits the use of same on an industrial scale without any problems in existing apparatus (for example, in a Nordson Meltex machine).

Thus, the present invention features single-component hot-melt adhesives which offer ease of use, a high storage stability, namely, several months at 25° C. and several hours at 130°–140° C., viscosities in use ≦10 Pa.s, an appropriate assembly time of 5 to 40 s, a high initial cohesion, a creep temperature under load which increases proportionately as the crosslinking progresses, and product flexibility after complete crosslinking.

In order to further illustrate the present invention and the advantages thereof, the following specific examples are given, it being understood that same are intended only as illustrative and in nowise limitative.

In said examples to follow, certain "initial cohesion" and "SAFT" determinations were made.

The measurement of the initial cohesion was carried out by depositing a line of hot-melt adhesive approximately 1.5 mm in diameter on a cardboard test piece. An identical second cardboard test piece was immediately applied to the first and the adhesively bonded joint thus produced was immediately suspended vertically by its upper end. The lower end was loaded with weights of 150 g, 250 g and 350 g after 15 s, 30 s and 60 s. The behavior of the adhesively bonded joint was rated at follows:

(a) no creep: no movement of the test pieces,
(b) very slight creep: slip on the order of one millimeter,
(c) creep: slip on the order of one centimeter,
(d) no cohesion: rupture of the adhesively bonded joint.

This test measured the rate of setting of the adhesive in the period of time (seconds) following the bonding.

The SAFT test is a test which measures the maximum temperature withstood by an adhesively bonded joint under a given load. The procedure was as follows: two beads of adhesive approximately 1 mm in diameter and at a distance of approximately 15 mm from one another were deposited at 130° C. at the end of a cardboard test piece 25 mm in width. An identical second test piece was immediately applied to the first and the adhesively bonded assembly thus obtained was allowed to cool. The bonding surface thus obtained was approximately 2.5×2.5=6.25 cm². The adhesively bonded assembly was next suspended vertically in an oven, loaded with a weight of 250 g or 500 g, and then subjected to a temperature increase from 25° C. to 200° C. at a rate of 0.4° C./min. The SAFT behavior is the temperature at which the assembly delaminated. This test was performed 1, 2, 3, 4, 5 and 6 days after bonding. The improvement, with time, in the heat behavior of the hot melt of the invention as a result of progressive crosslinking of the adhesive was demonstrated.

The free isocyanate content of the adhesives according to the invention is expressed hereinafter in grams of NCO per 100 g of adhesive. It was determined according to AFNOR standard 52132.

The melt index (MI) was measured at 190° C. under 2.16 kg according to ASTM standard D 1238-70, and expressed in g/10 min.

EXAMPLE 1

80 g of an ethylene/vinyl acetate/hydroxyethyl acrylate terpolymer and 68.23 g of Krystalex F-85 (α-methylstyrene resin marketed by Hercules) were introduced into a reactor fitted with an anchor stirrer, a heating jacket and a vacuum/nitrogen purge.

The terpolymer had the following characteristics: 69.3% of ethylene, 29.1% VA, 1.6% HEA, MI=400, Mn=7700, Mw=71,000, meq. OH=13.8.

The constituents were melted at 125°–130° C. and dried at a pressure of a few mbar for 1 h, 30 min. 20.25 g of dry 1-dodecanol followed by 31.52 g of MDI were then introduced at 125° C. i.e., a total NCO/total OH ratio= 2.1.

After 4 h, 30 min, of reaction, under dry nitrogen, a hot-melt adhesive was recovered which exhibited the following initial characteristics:

| | | |
|---|---|---|
| (i) | adhesive was transparent and homogeneous at 130° C. | |
| (ii) | viscosity at 130° C. | 8.7 Pa · s |
| (iii) | viscosity at 130° C. after 4 h, 30 min, at 130° C. | 9.7 Pa · s |
| (iv) | viscosity at 140° C. | 5.8 Pa · s |
| (v) | NCO content | 2.6% (Th: 2.77%) |
| (vi) | initial cohesion: after 15 s: very slight creep under 150 g after 30 s: no creep under 350 g after 1 min: no creep under 350 g | |
| (vii) | SAFT temperature: the following change in the SAFT behavior over time was observed: | |

| Elapsed time (d) | 1 | 2 | 3 | 4 | 5 | 6 |
|---|---|---|---|---|---|---|
| SAFT (250 g) | 67 | 67 | 85 | 165 | 170 | 170 |
| SAFT (500 g) | 66 | 66 | 69 | 72 | 135 | 150 |

REFERENCE TESTS

These tests demonstrated that it was indeed the hydroxylated terpolymer of the invention that was the source of the good initial cohesions and of the high SAFT behaviors that were determined (increase of 60°–70° C. relative to the controls).

Reference Test No. 1

This was strictly identical to the test of Example 1, but the terpolymer of the invention was replaced with a commercial 33/400 ethylene/vinyl acetate copolymer (namely, 33% VA, MI=400), in an identical amount. The total NCO/total OH ratio was 2.3.

The hot-melt adhesive obtained had the following characteristics:

| (i) | transparent and homogeneous at 130° C. | |
|---|---|---|
| (ii) | viscosity at 130° C. | 7.15 Pa · s |
| (iii) | viscosity at 130° C. after 4 h, 30 min, at 130° C. | 7.75 Pa · s |
| (iv) | viscosity at 140° C. | 4.6 Pa · s |
| (v) | NCO content | 2.85% (Th: 3.01%) |
| (vi) | initial cohesion: after 15 s: nil cohesion under 150 g after 30 s: nil cohesion under 150 g after 1 min: creep under 150 g | |
| (vii) | change in the SAFT behavior over time: | |

| Elapsed time (d) | 1 | 2 | 3 | 4 | 5 | 6 |
|---|---|---|---|---|---|---|
| SAFT (250 g) | 65 | 66 | 66 | 67 | 66 | 68 |
| SAFT (500 g) | 64 | 65 | 66 | 65 | 65 | 66 |

Reference Test No. 2

This was identical to the test No. 1, but the amount of MDI was reduced in order to return the total NCO/total OH ratio to the value of 2.1 employed in Example 1. The ethylene/vinyl acetate copolymer employed was the same as in reference test No. 1.

The adhesive obtained had the following characteristics:

| (i) | transparent and homogeneous at 130° C. | |
|---|---|---|
| (ii) | viscosity at 130° C. | 6.9 Pa · s |
| (iii) | viscosity at 130° C. after 4 h, 30 min, at 130° C. | 7.6 Pa · s |
| (iv) | viscosity at 140° C. | 5.1 Pa · s |
| (v) | NCO content | 2.76% (Th: 2.78%) |
| (vi) | initial cohesion: after 15 s: nil cohesion under 150 g after 30 s: nil cohesion under 150 g after 1 min: slight creep under 150 g | |
| (vii) | change in the SAFT behavior over time: | |

| Elapsed time (d) | 1 | 2 | 3 | 4 | 5 | 6 | 12 | 24 |
|---|---|---|---|---|---|---|---|---|
| SAFT (250 g) | 66 | 66 | 67 | 71 | 71 | 73 | 75 | 77 |
| SAFT (500 g) | 65 | 65 | 66 | 66.5 | 67 | 67 | 67 | 67 |

EXAMPLE 2

The procedure was identical to that of Example 1. 80 g of the same terpolymer as in Example 1 and 69.8 g of Krystalex F-85 were introduced.

After drying, 16.8 g of 1-dodecanol and 1.88 g of 1,12-dodecanediol were added, followed by 31.5 g of MDI (NCO/OH ratio of 2.1).

The adhesive obtained after 4 h, 30 min, of reaction at 125° C. had the following characteristics:

| (i) | transparent and homogeneous at 130° C. | |
|---|---|---|
| (ii) | viscosity at 130° C. | 9.25 Pa · s |
| (iii) | viscosity at 130° C. after 4 h, 30 min, at 130° C. | 10.6 Pa · s |
| (iv) | viscosity at 140° C. | 6.9 Pa · s |
| (v) | NCO content | 2.8% (Th: 2.77%) |
| (vi) | initial cohesion: after 15 s: slight creep under 150 g after 30 s: no creep under 350 g after 1 min: no creep under 350 g | |

-continued

| (vii) | change in the SAFT behavior over time: | | | | | |
|---|---|---|---|---|---|---|
| Elapsed time (d) | 1 | 2 | 3 | 4 | 5 | 6 |
| SAFT (250 g) | 77 | 78 | 114 | 164 | 175 | >200 |
| SAFT (500 g) | 67 | 71 | 74 | 88 | 120 | 130 |

Reference Test

This was strictly identical to the test of Example 2, but the terpolymer according to the invention was replaced by a 33/400 ethylene/vinyl acetate copolymer in identical amount (NCO/total OH ratio of 2.3).

The adhesive obtained had the following characteristics:

| (i) | transparent and homogeneous at 130° C. | |
|---|---|---|
| (ii) | viscosity at 130° C. | 8.1 Pa · s |
| (iii) | viscosity at 130° C. after 4 h, 30 min, at 130° C. | 9.1 Pa · s |
| (iv) | viscosity at 140° C. | 5.9 Pa · s |
| (v) | NCO content | 2.6% (Th: 3%) |
| (vi) | initial cohesion: after 15 s: no cohesion under 150 g after 30 s: no cohesion under 150 g after 1 min: slight creep under 150 g | |
| (vii) | change in the SAFT behavior over time: | |

| Elapsed time (d) | 1 | 2 | 3 | 4 | 5 | 6 |
|---|---|---|---|---|---|---|
| SAFT (250 g) | 65 | 67 | 78 | 95 | 90 | 95 |
| SAFT (500 g) | 64 | 65 | 67.5 | 72 | 75 | 72 |

The improvement in the SAFT behavior due to the terpolymer of the invention was here again on the order of 60° C.

EXAMPLE 3

This example illustrates the significance of the characteristics of the terpolymer according to the invention and, in particular, of its OH group content, determined by the hydroxyethyl acrylate content.

80 g of an ethylene/vinyl acetate/hydroxyethyl acrylate terpolymer and 70.7 g of Krystalex F-85 were introduced into the reactor described in Example 1.

The terpolymer had the following characteristics: 66.9% ethylene, 29.5% VA, 3.6% HEA, MI=1,250, Mn=5,490, Mw=44,800, meq. OH=31.

After drying, 17.75 g of dry 1-dodecanol were added, followed by 31.52 g of MDI (i.e., an NCO/OH ratio of 2.1, identical to that of Example 1). Setting (gelification) of the reaction mixture was observed after 30 min, making it necessary to stop the reaction. The same result was obtained with a terpolymer which had the following characteristics: 68.7% ethylene, 27.8% VA, 2.6% HEA, MI=400, Mn=5, 700, Mw=57,000, meq. OH=22.5.

These terpolymers cannot, therefore, be used by themselves for the intended application, as a result of their excessively high hydroxyl functional group content (> 20 meq. OH/100 g). A hydroxyl content greater than 20 meq. is described and exemplified in EP-A-0,380,379.

EXAMPLE 4

This example demonstrates that it is possible to employ a terpolymer having a high HEA content, provided that it is diluted with a nonhydroxylated EVA copolymer, to adjust to an OH content lower than 20 meq.

40 g of the EVA/HEA terpolymer described at the end of Example 3 (2.6% HEA), 40 g of a commercial EVA (33% VA, MI=400) and 68 g of Krystalex F-85 were introduced into the reactor described in Example 1.

After drying, 20 g of 1-dodecanol were then poured into the reactor, followed by 32 g of MDI (i.e., an NCO/OH ratio of 2.1, identical to that of Example 3).

After 4 h, 30 min, of reaction, a hot melt was obtained which had the following characteristics:

| (i) | transparent and homogeneous at 130° C. | |
|---|---|---|
| (ii) | viscosity at 130° C. | 7 Pa · s |
| (iii) | NCO content | 2.84% |
| (iv) | initial cohesion: | |
| | after 15 s: nil under 150 g | |
| | after 30 s: nil under 150 g | |
| | after 1 min: slight creep under 250 g | |
| (v) | change in the SAFT behavior over time: | |

| Elapsed time (d) | 1 | 2 | 3 | 4 | 5 | 6 |
|---|---|---|---|---|---|---|
| SAFT (250 g) | 57 | 66 | 69 | 163 | 170 | 180 |
| SAFT (500 g) | 51 | 64 | 66 | 68 | 90 | 90 |

EXAMPLE 5

This example demonstrates that a terpolymer according to the invention and containing 2.2% HEA can be employed pure for the intended application.

The terpolymer tested had the following characteristics: 70.3% ethylene, 27.5% VA, 2.2% HEA, MI= 550, Mn=5,750, Mw=46,000, meq. OH=19.

80 g of the above mentioned terpolymer and 68.5 g of Krystalex F-85 were introduced into the reactor of Example 1.

After drying, 19.5 g of dry 1-dodecanol were added, followed by 32 g of MDI (i.e., a total NCO/total OH ratio of 2.1).

After the usual reaction, a hot melt which had the following characteristics was recovered:

| (i) | transparent and homogeneous at 130° C. | |
|---|---|---|
| (ii) | viscosity at 130° C. | 9,200 cps |
| (iii) | viscosity after 4 h at 130° C. | 10,810 cps |
| (iv) | NCO content | 2.9% |
| (v) | initial cohesion: | |
| | after 15 s: no cohesion under 150 g | |
| | after 30 s: very slight creep under 250 g | |
| | after 1 min: no creep under 350 g | |
| (vi) | change in the SAFT behavior over time: | |

| Elapsed time (d) | 1 | 2 | 3 | 4 | 5 | 6 | 12 | 24 |
|---|---|---|---|---|---|---|---|---|
| SAFT (250 g) | 67 | 71 | 90 | 160 | 170 | >200 | >200 | >200 |
| SAFT (500 g) | 65 | 68 | 70 | 75 | 160 | 170 | >200 | >200 |

Shore A hardness:

The change in the hardness of the hot melt was measured simultaneously on a solid sheet of adhesive 2 mm in thickness, produced by molding at 130° C. The change was the following:

| Time (d) | 1 | 3 | 6 | 9 | 12 | 17 | 24 | 30 |
|---|---|---|---|---|---|---|---|---|
| Shore A hardness | 18 | 25 | 39 | 48 | 55 | 65 | 71 | 72 |

The slow speed of crosslinking was due to the large thickness of the sample. After one month of storage, the sheet of adhesive remained flexible and not brittle.

Tensile strength properties (after crosslinking):

These were measured on H2 type dumbbell test pieces (NFT standard 51-034) cut from a solid sheet of adhesive of 2 mm thickness.

The control employed was a commercial 33/400 EVA/Krystalex F-85 mixture in a proportion of 40/60 by weight, namely, with the same EVA content as the modified formulation.

The results were the following (pull speed 50 mm/min):

| | Formulation according to the invention | | Control (not crosslinkable) |
|---|---|---|---|
| | after 12 d | after 24 d | |
| Elongation at break (%) | 600 | 600 | >1,000 |
| Max. tensile strength (MPa) | 1 | 2.3 | 0.7 |

EXAMPLE 6

This example illustrates the use of hydroxylated derivatives other than dodecanol to destroy the excess MDI employed.

The terpolymer according to the invention which was employed had the following characteristics: 69.8% ethylene, 29% VA, 1.2% HEA, MI 900, Mw 6,430, Mn 39,900, meq. OH=10.3.

80 g of the above terpolymer, 47.5 g of Bevilite (Hercules resin with an OH value of 24) and 41 g of resin 8941 bis (DRT resin with an OH value of 125) were introduced into the reactor of Example 1.

After drying the constituents, 31.5 g of MDI were introduced, i.e., an NCO/OH ratio of 2.1.

After the usual reaction, a hot-melt adhesive was obtained which had the following characteristics:

| (i) | transparent at 130° C. | |
|---|---|---|
| (ii) | viscosity at 130° C. | 15.5 Pa · s |
| (iii) | viscosity after 4 h at 130° | 23 Pa · s |
| (iv) | NCO content | 3.05% |
| (v) | initial cohesion: | |
| | after 15 s: creep under 250 g | |
| | after 30 s: creep under 350 g | |
| | after 1 min: no creep under 350 g | |
| (vi) | change in the SAFT behavior over time: | |

| Elapsed time (d) | 1 | 2 | 3 | 14 | 5 | 6 |
|---|---|---|---|---|---|---|
| SAFT (250 g) | 67 | 96 | >200 | >200 | >200 | >200 |
| SAFT (500 g) | 66 | 72 | 125 | 150 | 160 | 180 |

EXAMPLE 7

This example illustrates the use of a lower total NCO/total OH molar ratio.

The terpolymer employed was the same as in Example 5.

80 g of the terpolymer of Example 5 and 71.5 g of Krystalex F-85 were introduced into the reactor of Example 1. After the drying, 19.5 g of dry 1-dodecanol were added, followed by 29 g of MDI (i.e., an NCO/OH ratio of 1.9).

The hot-melt adhesive recovered after 4 h, 30 min, of reaction at 125° C. had the following characteristics:

| | | |
|---|---|---|
| (i) | transparent and homogeneous at 130° C. | |
| (ii) | viscosity at 130° C. | 11.1 Pa · s |
| (iii) | viscosity after 4 h at 130° C. | 12.9 Pa · s |
| (iv) | viscosity at 140° C. | 7.5 Pa · s |
| (v) | NCO content | 2.15% |
| (vi) | initial cohesion: | |
| | after 15 s: no creep under 150 g | |
| | after 30 s and 60 s: no creep under 350 g | |
| (vii) | change in the SAFT behavior over time: | |

| Elapsed time (d) | 1 | 2 | 3 | 4 | 5 | 6 |
|---|---|---|---|---|---|---|
| SAFT (250 g) | 67 | 69 | 70 | 76 | 89 | 173 |
| SAFT (500 g) | 66 | 67 | 67 | 69 | 72 | 162 |

It will be appreciated that the increase in viscosity linked to the decrease in the NCO/OH ratio remained completely acceptable.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A process for the preparation of a hot-melt adhesive comprising (a) melting and drying an EVA terpolymer having a melt index at 190° C. ranging from 100 to 1,000 grs/10 minutes and comprising from 60 to 90% by weight ethylene, 10 to 40% by weight vinyl acetate and an ethylenically unsaturated termonomer bearing at least one primary hydroxyl functional group per mole, (b) reacting said EVA terpolymer with a polyisocyanate to form a polyisocyanated EVA terpolymer and (c) contacting said EVA terpolymer with an alcohol to obtain a moisture-curable hot-melt adhesive having a desired content of free NCO functional groups.

2. The process according to claim 1, wherein said contacting said EVA terpolymer with said alcohol is prior to said reacting with said polyisocyanate.

3. The process as defined by claim 1, wherein said hot-melt adhesive comprises from 1% to 5% by weight of free isocyanate functional groups.

4. The process as defined by claim 3, wherein said hot-melt adhesive comprises from 2% to 3% by weight of free isocyanate functional groups.

5. The process as defined by claim 1, wherein said EVA terpolymer comprises (1) from 65% to 80% by weight of ethylene, (2) from 20% to 35% by weight of vinyl acetate and (3) from 10 to 20 meq. OH of an ethylenically unsaturated termonomer bearing at least one primary hydroxyl functional group per mole.

6. The process as defined by claim 1, wherein said polyisocyanated terpolymer has a melt index at 190° C. ranging from 400 to 800.

7. The process as defined by claim 1, wherein said ethylenically unsaturated termonomer has the formula:

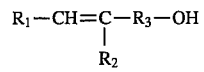

in which $R_1$ is hydrogen or a hydrocarbyl radical having from 1 to 8 carbon atoms; $R_2$ is hydrogen or a hydrocarbyl radical having from 1 to 4 carbon atoms; and $R_3$ is a divalent ester or $(CH_2)_n$ group, wherein n ranges from 0 to 10.

8. The process as defined by claim 7, wherein said ethylenically unsaturated termonomer comprises allyl alcohol, oleyl alcohol, vinyl alcohol, 2-hydroxyethyl methacrylate, 2-hydroxyethyl acrylate, or mixture thereof.

9. The process as defined by claim 1, wherein said terpolymer has been polyisocyanated with a diisocyanate.

10. The process as defined by claim 9, wherein said diisocyanate comprises 2,4-tolylene diisocyanate, diphenylmethane diisocyanate, hexamethylene diisocyanate or isophorone diisocyanate.

11. The process as defined by claim 1, further comprising adding a tackifying resin to said terpolymer.

12. The process as defined by claim 11, wherein the tackifying resin/terpolymer ratio by weight is not greater than 3.

13. A hot-melt adhesive forming composition comprising (a) an EVA terpolymer having a melt index at 190° C. ranging from 100 to 1,000 grs/10 minutes and comprising 60 to 90% by weight ethylene, 10 to 40% by weight vinyl acetate and at least 5 meq. OH of an ethylenically unsaturated termonomer bearing at least one primary hydroxyl functional group per mole, (b) a polyisocyanate which forms a polyisocyanated EVA terpolymer when reacted with said EVA terpolymer and (c) an alcohol which neutralizes excess isocyanate.

14. The hot-melt adhesive forming composition according to claim 13, wherein said alcohol is a monoalcohol or mixture of a monoalcohol and a dialcohol.

15. The hot-melt adhesive forming composition according to claim 13, wherein said composition possesses a total NCO/total OH ratio of 1.5 to 2.5.

16. The hot-melt adhesive forming composition according to claim 13, comprising 5 to 60 meq. OH of said ethylenically unsaturated termonomer.

17. The hot-melt adhesive forming composition according to claim 16, comprising 5 to 20 meq. OH of said ethylenically unsaturated termonomer.

18. A hot-melt adhesive comprising the reaction product of (a) a melted and dried EVA terpolymer having a melt index at 190° C. ranging from 100 to 1,000 grs/10 minutes and comprising 60 to 90% by weight ethylene, 10 to 40% by weight vinyl acetate and an ethylenically unsaturated termonomer bearing at least one primary hydroxyl functional group per mole, (b) a polyisocyanate which forms a polyisocyanated EVA terpolymer when reacted with said EVA terpolymer and (c) an alcohol which neutralizes excess isocyanate.

19. The hot-melt adhesive according to claim 18, having a viscosity of $\leq 10$ Pa.s.

20. The hot-melt adhesive according to claim 19, having a viscosity of 5 to 10 Pa.s.

* * * * *